United States Patent
Otagaki et al.

(10) Patent No.: US 10,151,616 B1
(45) Date of Patent: Dec. 11, 2018

(54) FLOWABLE MATERIAL LEVEL SENSING WITH SHAPED ELECTRODES

(71) Applicant: SEMICONDUCTOR COMPONENTS INDUSTRIES, LLC, Phoenix, AZ (US)

(72) Inventors: Takayasu Otagaki, Ota (JP); Kazuyoshi Ishikawa, Kumagaya (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/824,028

(22) Filed: Nov. 28, 2017

(51) Int. Cl.
*G01F 23/26* (2006.01)
*B65D 25/20* (2006.01)
(Continued)

(52) U.S. Cl.
CPC .......... *G01F 23/265* (2013.01); *B65D 25/02* (2013.01); *B65D 25/20* (2013.01); *B65D 90/48* (2013.01);
(Continued)

(58) Field of Classification Search
CPC ........ G06F 3/0412; G06F 3/044; G06F 1/263; G06F 2203/04101; G06F 3/0418;
(Continued)

(56) References Cited

U.S. PATENT DOCUMENTS

| | | | | |
|---|---|---|---|---|
| 4,317,128 A | * | 2/1982 | Dijkmans | ........... H01L 27/0825 257/532 |
| 5,969,258 A | * | 10/1999 | Gerst | ...................... G01L 9/125 361/283.4 |

(Continued)

FOREIGN PATENT DOCUMENTS

| | | |
|---|---|---|
| JP | H11352089 A | 12/1999 |
| JP | 2013171819 A | 9/2013 |

(Continued)

OTHER PUBLICATIONS

Takayasu Otagaki et al., "Pattern Layout of Touch Sensor," U.S. Appl. No. 15/600,415, filed May 19, 2017, 43 pages.
(Continued)

*Primary Examiner* — Daniel Previl
(74) *Attorney, Agent, or Firm* — Ramey & Schwaller, LLP (57) ABSTRACT

Level sensing designs and techniques that inherently compensate for physical variations in the flowable material. An illustrative container includes an electrode arrangement having two electrodes along a vertical span creating corresponding capacitances indicative of a level of the material within that vertical span. Differing electrode shapes or positions provide the capacitances with different dependences on the level. A level detection method includes: (i) measuring a first capacitance between a drive electrode and a first sensing electrode; (ii) measuring a second capacitance between the drive electrode and a second sensing electrode; and (iii) determining a ratio of variances in the first and second capacitances, the variances being relative to first and second capacitances for a container empty of the material. The ratio is indicative of said level and insensitive to temperature and permittivity of the material.

10 Claims, 4 Drawing Sheets

(51) Int. Cl.
 *B65D 25/02* (2006.01)
 *G08B 21/18* (2006.01)
 *B65D 90/48* (2006.01)

(52) U.S. Cl.
 CPC .......... *G01F 23/266* (2013.01); *G01F 23/268* (2013.01); *G08B 21/182* (2013.01)

(58) Field of Classification Search
 CPC ........ G06F 15/00; G06F 3/0416; H02M 1/08; H02M 2001/0009; H02M 2001/0025; H02M 3/156; H02M 3/157; H02M 3/1582; H02M 3/1588
 USPC ....... 340/612, 620, 618, 613, 623, 603, 632, 340/636.18, 3.7, 7.55, 387.1
 See application file for complete search history.

(56) References Cited

U.S. PATENT DOCUMENTS

| | | | | |
|---|---|---|---|---|
| 6,490,920 | B1* | 12/2002 | Netzer | G01C 9/06 324/687 |
| 2002/0116999 | A1* | 8/2002 | Heger | G01F 23/265 73/304 C |
| 2012/0001867 | A1* | 1/2012 | Kawaguchi | G06F 3/044 345/174 |
| 2012/0044201 | A1* | 2/2012 | XiaoPing | G06F 3/044 345/174 |
| 2014/0292396 | A1 | 10/2014 | Bruwer et al. | |
| 2017/0119970 | A1* | 5/2017 | Bammer | A61M 5/24 |

FOREIGN PATENT DOCUMENTS

| | | |
|---|---|---|
| JP | 2014191654 A | 10/2014 |
| JP | 2015163871 A | 9/2015 |

OTHER PUBLICATIONS

Tetsuya Tokunaga et al., "Capacitance Liquid Level Sensor," U.S. Appl. No. 15/628,232, filed Jun. 20, 2017, 58 pages.

Takayasu Otagaki et al., "Capacitive Sensor for Liquid Sensing," U.S. Appl. No. 15/688,641, filed Aug. 28, 2017, 31 pages.

* cited by examiner

FLOWABLE MATERIAL LEVEL SENSING WITH SHAPED ELECTRODES

CROSS-REFERENCE TO RELATED APPLICATIONS

None.

BACKGROUND

Flowable materials such as liquids, powders, and other materials that, in the aggregate, conform to the shape of a container from the bottom up, are often stored in containers. Such containers can assume many forms including silos, tanks, bladders, boxes, jars, bottles, cartridges, tubes, vials, cavities, and tubes. When such containers are remotely located, concealed, or in motion, or where the container wall is rigid and/or opaque, it is often desirable to equip the container (or the apparatus receiving the container) with a sensor that can detect the level of flowable material in the container.

As used herein, the term "level" refers to a vertical position of the flowable material's top surface, and depending on the shape of the container, and on the topography, motion, and composition of the top surface, the position may be approximate (e.g., anywhere in a range between highest and lowest points on the top surface), averaged (e.g, over spatial and time dimensions), or correspond with a particular position characteristic of the top surface (e.g, meniscus, topographic maximum, time-windowed minimum). Such variations are generally design options that, given suitable calibration, can be implemented at will by the designer of the level sensing system.

Traditional level sensor designs often require moving parts, which are vulnerable to friction, corrosion, and the accumulation of dirt or debris, each of which can vary the operation of the sensor in a way that introduces uncertainty into the measured level. Designs that do not require moving parts often rely on physical characteristics of the flowable material, and when such physical properties vary (e.g., due to changes in temperature), designs that fail to compensate for such variations are again susceptible to measurement uncertainty. Incorporating compensation for such effects typically contributes undesirable complexity and cost to the level sensing system.

SUMMARY

Accordingly, there is herein disclosed designs and techniques that enable inexpensive implementation of a robust level sensing system that compensates for variations in the physical characteristics of the flowable material. In at least some embodiments, a container includes a cavity for holding a flowable material. The container includes an electrode arrangement having at least two electrodes along a given vertical span of the container to create corresponding capacitances that are indicative of a level of the material within that vertical span. Due differing electrode shapes or positions, one of the capacitances has a first dependence on the level that is different than the other capacitance's dependence on the level.

In at least some embodiments, an apparatus for receiving a container of flowable material includes an electrode arrangement positioned to be adjacent to the container's cavity. As before, the electrode arrangement has at least two electrodes along a given vertical span of the container to create corresponding capacitances having different dependencies on the level of the material within that vertical span. The apparatus further includes a circuit coupled to the electrode arrangement to sense the capacitances and to determine a ratio of the capacitances which is indicative of the level while being insensitive to variations in the physical characteristics of the flowable material.

In at least some embodiments, a method of detecting a level of a material in a container includes: (i) measuring a first capacitance between a drive electrode and a first sensing electrode having a vertical span along a wall of the container; (ii) measuring a second capacitance between the drive electrode and a second sensing electrode also having said vertical span along the wall of the container, the second capacitance having a dependence on said level that is different from a dependence of the first capacitance; and (iii) determining a ratio of variances in the first and second capacitances, the variances being relative to first and second capacitances for a container empty of the material. The ratio is indicative of said level and insensitive to temperature and permittivity of the material.

The embodiments identified above can be implemented individually or together, and as indicated by the appended claims, they may further include any one or more of the following features in any suitable combination: 1. At least one of the two electrodes has a width that varies as a function of the level. 2. At least one of the two electrodes is triangular. 3. One of the two electrodes is triangular having a width that increases as a function of the level, and the other of the two electrodes is triangular having a width that decreases as a function of the level. 4. At least one of the capacitances varies quadratically as a function of the level. 5. The electrode arrangement further includes a drive electrode capacitively coupled to each of the two electrodes. 6. At least one of the two electrodes has a separation from the drive electrode, the separation varying as a function of said level. 7. At least one of the two electrodes has a covered perimeter that varies as a function of the level with a dependence that is different from a covered perimeter of another of the two electrodes. 8. The circuit derives a measured level from the ratio. 9. A warning indicator that is activated when the ratio or indicated level is below a predetermined threshold.

It should be understood, however, that the specific embodiments given in the drawings and detailed description do not limit the disclosure. On the contrary, they provide the foundation for one of ordinary skill to discern the alternative forms, equivalents, and modifications that are encompassed in the scope of the appended claims.

DETAILED DESCRIPTION

Figure 1:
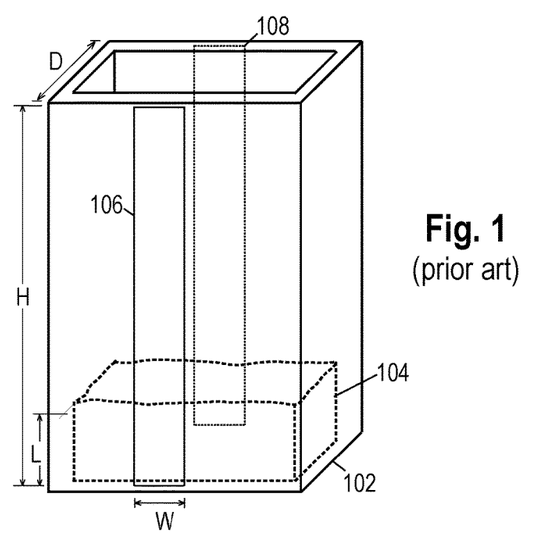
FIG. 1 is a schematic of an illustrative container with an existing electrode arrangement for level sensing.

To illustrate the challenges of level sensing and some of the shortcomings of existing solutions, FIG. 1 shows an illustrative container 102 that holds a quantity of flowable material 104. An electrode arrangement on the container walls includes a rectangular front electrode 106 aligned with and parallel to a rectangular back electrode 108 (also referred to herein as a drive electrode) that each extend over substantially the full span of levels that can be achieved by the top surface of flowable material 104. Parameters W, D, H, L are shown, representing the width W of the parallel electrodes 106, 108, the distance D between the electrodes, the height H of the electrodes (which here is substantially the same as the maximum level of the flowable material), and level L of the flowable material. While the electrode arrangement is shown here on the outside of the container walls, they may alternatively be located on the inside of the container walls or even immersed in the flowable material, so long as the electrode material is insulated. Indeed, if the container walls are conductive, it may be preferred to position the electrodes inside the container.

The capacitance of a parallel plate capacitor can be approximated as:

$$C = \frac{k\varepsilon_0 A}{d} \tag{1}$$

where $\varepsilon_0$ is the vacuum permittivity, A is the electrode area, and d is the distance between the electrodes. The relative permittivity k depends on the composition of the material between the electrodes (including the walls if the electrodes are positioned outside the container). If the container is empty, the relative permittivity k is approximately 1. If the container is full, the relative permittivity k is approximately equal to that of the flowable material. For most flowable materials of interest, this value is substantially different than 1. Water (and many water solutions such as ink), for example, has a relative permittivity of about 80. Methanol has a permittivity of about 30. Print toner can vary substantially, but generally exceeds a relative permittivity of 5.

The capacitance between parallel electrodes 106, 108, when the container is partly filled can be approximated as the sum of two capacitors having different relative permittivities (the first of the two capacitors being that portion of the electrodes separated by air, and the second of the two capacitors being that portion of the electrodes separated by flowable material):

$$C_{measured} = \tag{2}$$
$$C_{air} + C_{matl} = \frac{\varepsilon_0 W(H-L)}{D} + \frac{k\varepsilon_0 W(L)}{D} = \frac{\varepsilon_0 WH}{D}\left[1 + \frac{L}{H}(k-1)\right]$$

If compared and normalized with respect to the empty-container capacitance (the capacitance when L=0), this expression provides a linear indication of the level L, assuming the relative permittivity k is known:

$$\frac{C_{measured} - C_0}{C_0} = \frac{\Delta C}{C_0} = \frac{L}{H}(k-1) \tag{3}$$

In situations where different materials may be placed in the container, or where the flowable material has a relative permittivity that is strongly dependent on temperature (e.g., water), this sensor configuration becomes unreliable without some form of compensation. In existing solutions, such compensation tends to be undesirably complex and/or expensive.

Figure 2:
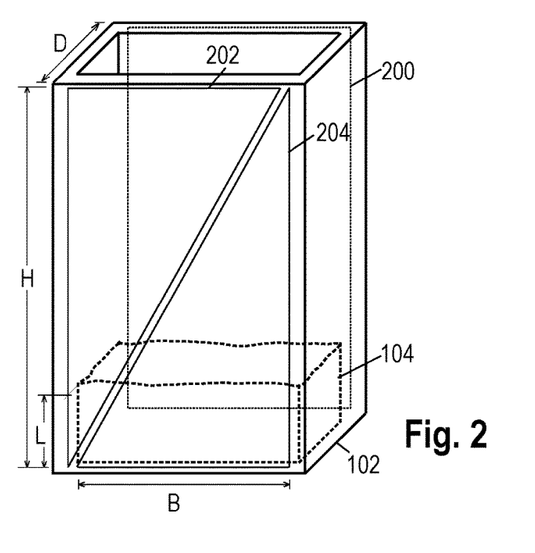
FIG. 2 is a schematic of an illustrative container with an improved electrode arrangement for level sensing.

FIG. 2 shows an illustrative electrode arrangement that offers a robust level sensing solution by providing multiple capacitances that exhibit different dependencies on the level L. In the electrode arrangement of FIG. 2, the drive electrode 200 is again aligned with and parallel to the front electrodes 202, 204 (also referred to herein as sensing electrodes). Sensing electrode 202 is triangular, with a width that increases as a function of the level L. Conversely, triangular front electrode 204 exhibits a width that decreases as a function of the level L. The two front electrodes each extend across the same vertical span, which in this case is substantially equal to the height of the container 102.

When the container 102 is partly filled with a flowable material having level L, the covered area of the electrodes is:

$$A_1 = \frac{B}{2H}L^2 \text{ and } A_2 = BL - \frac{B}{2H}L^2 \tag{4}$$

where B is the base length of the triangular electrodes. Note that these areas (and hence the variations in capacitance) vary quadratically as a function of level L. Employing these areas in the foregoing analysis yields:

$$\frac{\Delta C_1}{C_0} = (k-1)\frac{L^2}{H^2} \tag{5}$$

$$\frac{\Delta C_2}{C_0} = (k-1)\left[\frac{2L}{H} - \frac{L^2}{H^2}\right] \tag{6}$$

While these normalized variations in capacitance remain sensitive to relative permittivity of the flowable material, it may be observed that their variations are different functions of the level L. Accordingly, taking their ratio yields:

$$\frac{\Delta C_1}{\Delta C_2} = \frac{L}{2H - L} \text{ for } 0 \leq L \leq H \tag{7}$$

Notably, this ratio varies from one to zero as the container goes from full to empty. Moreover, this ratio is insensitive to the permittivity of the flowable material and any temperature variation thereof.

Figure 3:
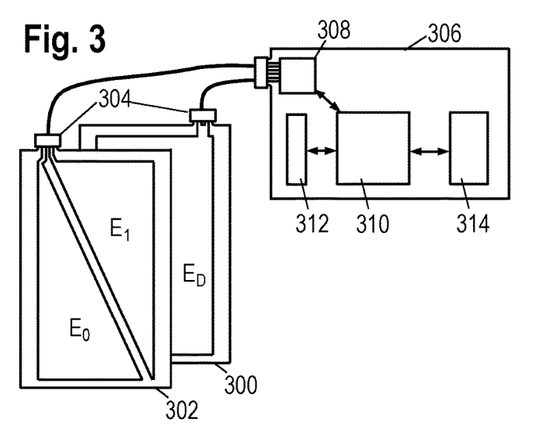
FIG. 3 is a component view of an illustrative level sensing system.

FIG. 3 shows an illustrative embodiment of a level sensing system that employs the foregoing principles. A printed circuit board 300 is provided with a drive electrode $E_D$, and a second printed circuit board 302 is provided with two triangular sensing electrodes $E_0$, $E_1$ as described previously. These printed circuit boards may be attached to, or embedded in, opposing walls of a container having a cavity for receiving flowable material. Alternatively, these printed circuit boards may form, or may be mounted on, opposing walls of a receptacle that receives a replaceable container of flowable material, such that the electrodes are positioned near the flowable material cavity whenever a container is inserted.

In the illustrated system, connectors 304 couple the electrodes to a controller board 306 having a driver circuit 308. A processor or programmable controller 310 may operate in accordance with software instructions in a memory 312, which cause the processor 310 to configure and trigger operation of the driver circuit 308, enabling it to sense the capacitances formed by the arrangement of electrodes on boards 300, 302. The software instructions may further configure the processor to form a ratio of capacitances having different dependencies on the level of flowable material in the container, thereby deriving a measure of the level which is insensitive to temperature and other physical parameters of the flowable material. The software instructions may still further configure the processor to report the level via a host interface 314 to a host computer, and/or to compare the level to one or more thresholds. If the processor determines, for example, that the level has dropped below a minimum desirable level, or has exceeded a maximum allowable limit, the software instructions may cause the processor to create a warning message, which could take the form of an audible alert, a visual warning light, or a message to the host computer.

Driver circuit 308 can employ any of various techniques for sensing the capacitances formed by the electrode arrangement. Capacitance sensing techniques include observing a charge/discharge rate (e.g., in response to a fixed current or in response to a voltage pulse supplied via a known impedance), observing an oscillation frequency when the capacitance is incorporated into a resonant tank or active oscillator, and distributing charge to/from known capacitances.

Figure 4:
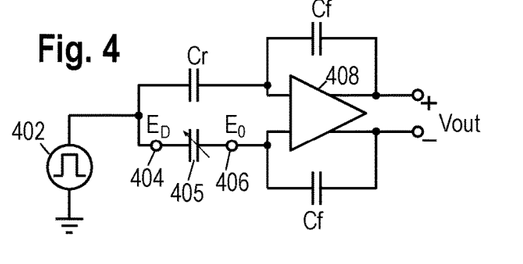
FIG. 4 is schematic of an illustrative capacitance sensing circuit.

FIG. 4 shows an illustrative capacitance sensing circuit which may be employed by a driver circuit 308. The illustrative sensing circuit includes a voltage (or current) pulse generator 402 that supplies a pulse to a drive electrode $E_D$ (e.g., back electrode 200) via terminal 404. Variable capacitance 405 represents one of the capacitances created between the drive electrode and a sensing electrode (e.g., $E_0$) that is coupled to sensing terminal 406. The sensing terminal 406 is coupled to one of the inputs of a fully differential amplifier 408.

Coupled between the other input of the amplifier 408 and the pulse generator 402 is a reference capacitor $C_r$. Each of these inputs is coupled by a feedback capacitor $C_f$ to a respective output of the fully differential amplifier 408. The differential voltage between the outputs of the amplifier 408 is designated Vout, and as the pulse from the pulse generator charges $C_r$ and variable capacitance 405, Vout is proportional to the difference $\Delta C$ between $C_r$ and variable capacitance 405. The reference capacitance may be chosen to substantially equal the empty-container capacitance, or an offset may be applied to Vout, so that this difference matches the capacitance variation due to the presence of the flowable material.

As there are multiple sensing electrodes, the driver circuit may employ a multiplexer to couple selected sensing electrodes $E_0$, $E_1$ to the input of amplifier 408. Alternatively, a separate amplifier (with corresponding reference and feedback capacitors) may be provided for each sensing electrode, enabling the sensing capacitances to be measured simultaneously.

If the circuit of FIG. 4 were to be applied to the electrode arrangement of FIG. 1, it would be necessary to determine a scaling factor to normalize the capacitance variation or otherwise convert the capacitance variation to a meaningful level measurement. However, embodiments that rely on ratios of the capacitance variation measurements may postpone or entirely omit the normalization step, as the ratios are self-normalizing if the Cf and Cr component values for the different sensing electrode measurements are matched. If the values of the electrical components are mismatched, a calibration coefficient may be applied to the ratio to adjust the maximum value to equal 100%.

Figure 5:
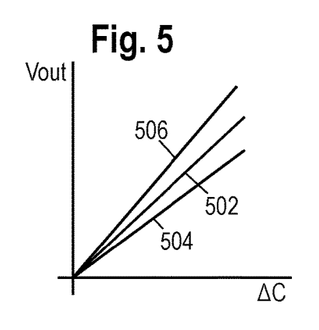
FIG. 5 is a graph showing illustrative effects of physical parameter variation.

FIG. 5 is a graph of Vout versus capacitance variation for the electrode arrangement of FIG. 1. Curve 502 shows a linear dependence of Vout on capacitance variation when the relative permittivity is a nominal value. However, when a temperature shift is present that causes, e.g., a 20% variation in the relative permittivity, the linear dependence can shift lower (curve 504) or higher (curve 506), making it difficult to accurately determine the level in the absence of some form of compensation.

Figure 6:
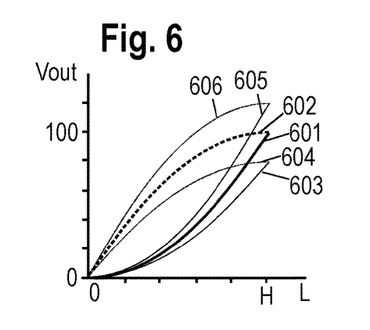
FIG. 6 is a graph showing illustrative effects of parameter variation in the improved electrode arrangement.

FIG. 6 is a graph of Vout versus level L for the capacitances created by each of the two triangular electrodes of FIG. 2 with the back electrode. Curve 601 shows the dependence for electrode 202, while curve 602 shows the dependence for electrode 204. As with the previous example, permittivity variations will cause these curves to shift downward (curves 603, 604) or upward (curves 605, 606).

Figure 7:
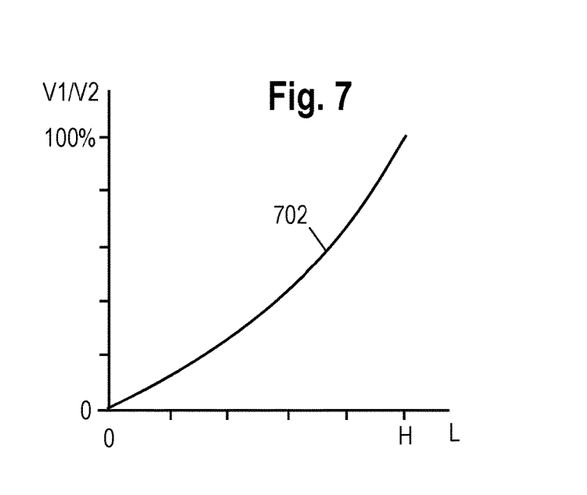
FIG. 7 is graph showing an illustrative ratio indicative of level but insensitive to parameter variation.

FIG. 7 is a graph of the ratio between the Vout measurement for electrode 202 (V1) and the Vout measurement for electrode 204 (V2). Curve 702 extends from 0 to 100% as the level L rises from zero (empty) to H (full). Curve 702 does not shift in response to permittivity or temperature changes, enabling precise level measurements without complex or expensive compensation.

Figure 8:
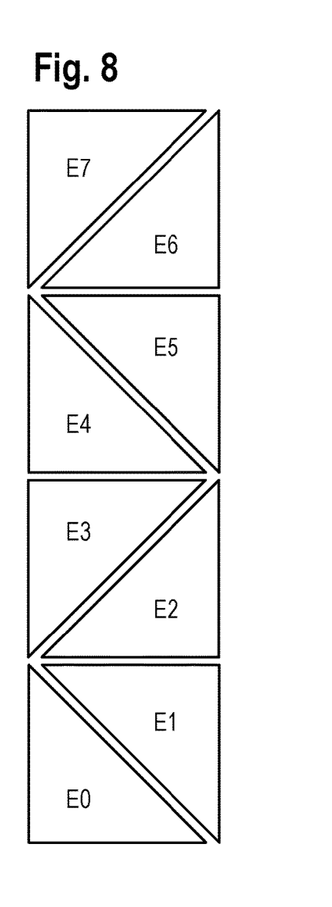
FIG. 8 is a graph showing an illustrative electrode arrangement with segmentation.

The illustrated principle can be extended. FIG. 8 shows an electrode arrangement that segments the full height of the container into four equal vertical spans. Two triangular electrodes E0, E1 cover the lowest span, with one electrode having width that decreases with level L while the other has a width that increases with level L. The next lowest span is covered by two more triangular electrodes E2, E3. Electrodes E4, E5 are provided over the next span, while the highest vertical span is covered by a last two electrodes E6, E7. Each of these sensing electrodes create a corresponding capacitance with a back electrode 200 that may serve as a drive electrode for each capacitance.

Figure 9:
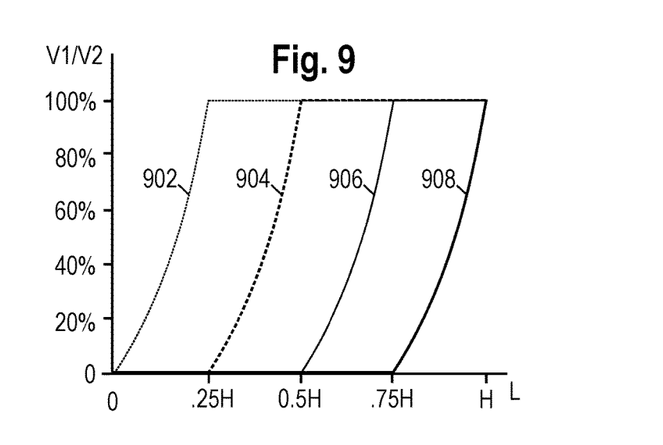
FIG. 9 is a graph showing illustrative measurements using the segmented electrode arrangement.

As shown in FIG. 9, the electrode arrangement of FIG. 8 offers multiple, spaced curves of increased steepness. Over the lowest vertical span, curve 902 shows the Vout ratio for capacitance variations of E0, E1 rising with level L from 0 to 100%. Over the next lowest span, curve 904 rises with level L from 0 to 100%. Curves 906 and 904 rise similarly over the third and last vertical spans. This arrangement may thus provide an even more precise measurement of the level L of flowable material in the container.

Figure 10:
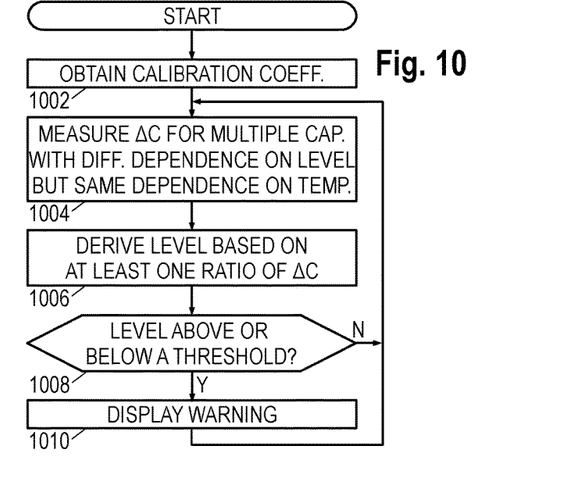
FIG. 10 is a flow diagram of an illustrative level sensing method.

FIG. 10 is a flow diagram of an illustrative level sensing method. The illustrative method begins in block 1002 with obtaining a calibration coefficients (e.g., an offset and scale factor) to compensate for imperfections in the driver circuitry. Such calibration coefficients can be determined by the manufacturer and stored in memory.

In block 1004, the driver circuit detects a capacitance variation ΔC for each of multiple capacitances defined between the sensing electrodes and a drive electrode. In at least some contemplated embodiments, the driver circuit supplies a pulse to the drive electrode and senses a change via each sensing terminal coupled to a sensing electrode. The geometry of the sensing and drive electrodes in the arrangement is designed to provide each capacitance variation with a different dependence on the level. Due to the nature of the flowable material, each capacitance variation may be expected to have the same dependence on permittivity and temperature.

In block 1006, the driver circuit, or perhaps a programmable controller coupled to the driver circuit, calculates a ratio of the capacitance variations, deriving an indicator of the level of flowable material in the container while eliminating any dependence on permittivity and temperature. (If both capacitance variations are substantially zero, the level indicator may be set to zero without attempting the ratio calculation.) Where calibration coefficients are present, the driver or controller applies the calibration coefficients to the ratio to compensate for imperfections in the driver circuit.

In block 1008, a programmable controller compares the level indicator to a threshold. If for example the level is above a predetermined maximum threshold (or conversely, if it is below a predetermined minimum threshold), then in block 1010 the controller issues a warning. In various embodiments, the warning is a message displayed on a screen, an illuminated light, or an audible alert. If no threshold crossing is detected in block 1008, or after the warning has issued in block 1010, the method returns to block 1004 to make a subsequent measurement. In alternative embodiments, the programmable controller may control a gauge or indicator that continuously displays the indicated level.

To achieve the desired insensitivity to temperature and permittivity, the programmable controller calculates a ratio of measurements that exhibit the same dependence on permittivity, but different dependence on the level. The permittivity dependences cancel, and the level dependences combine, when the ratio is taken. So long as the level dependences are not simply scaled versions of each other, their combination provides a meaningful measure of the level. One way to provide a useful dependency difference is to create a different offset in the measurement's dependence on level. For example, a triangular electrode with corner on bottom has a zero offset, whereas a triangular electrode with an edge on bottom has a non-zero offset.

Figure 11A:
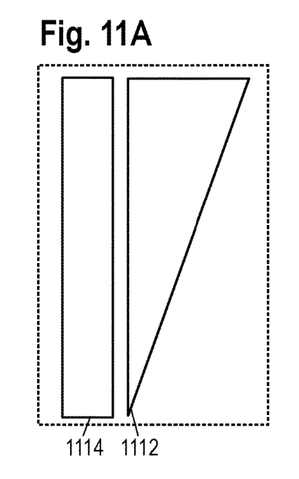
FIGS. 11A, 11B, and 11C are diagrams of alternative electrode arrangements for level sensing.

Another example of a meaningful difference is having measurements with different power law dependences on level (e.g., linear versus quadratic). FIG. 11 A shows an arrangement of two sensing electrodes 1112, 1114. Sensing electrode 1112 is triangular, whereas sensing electrode 1114 is rectangular. (A drive electrode 200 may also be present as shown in FIG. 2.) The capacitance variations when a flowable material is present are, respectively:

$$\frac{\Delta C_T}{C_{T0}} = (k-1)\frac{L^2}{H^2} \tag{8}$$

$$\frac{\Delta C_R}{C_{R0}} = (k-1)\frac{L}{H} \tag{9}$$

Where $C_{T0}$ and $C_{R0}$ are the capacitances for the triangular and rectangular electrodes when the container is empty. Taking their ratio yields:

$$\frac{\Delta C_T}{\Delta C_R} = \left(\frac{C_{T0}}{C_{R0}}\right)\frac{L}{H} \text{ for } 0 \le L \le H \tag{10}$$

If the electrodes are sized to have equal initial capacitances, this ratio varies from one to zero as the container goes from full to empty. As before, this ratio is insensitive to the permittivity of the flowable material and any temperature variation thereof.

Figure 11B:
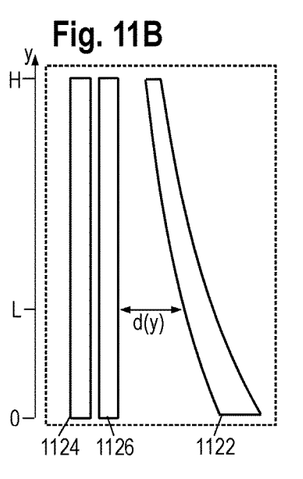

Though the examples of electrode arrangements providing different level dependences discussed above rely on electrodes having widths that vary differently as a function of level, a similar effect can be controlled by varying the electrode separations as a function of level. FIG. 11B shows two sensing electrodes 1122, 1124 with a drive electrode 1126 positioned between them. If, for example, the separation between electrodes 1122 and 1126 varies in this fashion:

$$d(y) = \frac{H}{H+y} \tag{11}$$

The normalized capacitance variation when a flowable material is present is:

$$\frac{\Delta C_V}{C_{V0}} = \frac{(k-1)}{3}\left(\frac{2L}{H} + \frac{L^2}{H^2}\right) \tag{12}$$

Where $C_{V0}$ is the initial capacitance for the electrode with variable separation. Taking $C_{F0}$ as the initial capacitance for the electrode 1124 with fixed separation from the drive electrode 1126, the normalized capacitance variation is:

$$\frac{\Delta C_F}{C_{F0}} = (k-1)\frac{L}{H} \tag{13}$$

The ratio then becomes:

$$\frac{\Delta C_V}{\Delta C_F} = \frac{1}{3}\left(\frac{C_{V0}}{C_{F0}}\right)\left(2 + \frac{L}{H}\right) \text{ for } 0 \le L \le H \tag{14}$$

This ratio remains sensitive to level L while being insensitive to the permittivity of the flowable material and any temperature variation thereof.

Figure 11C:
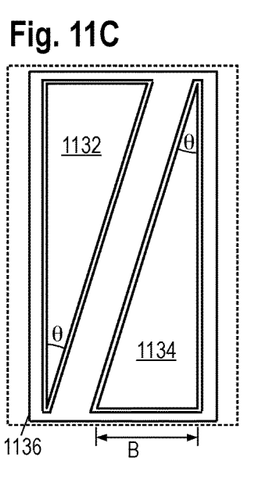

With the drive electrode being on the same plane as the sensing electrodes, the perimeter of the sensing electrodes becomes another factor that can be used to provide capacitance variations with different dependences on level L. FIG. 11C shows triangular sensing electrodes 1132, 1134 surrounded by a drive electrode 1136. The capacitance variation calculation is more complex, but the ratio remains insensitive to permittivity and temperature, and is approximately:

$$\frac{\Delta C_1}{\Delta C_2} = \frac{L}{\frac{B}{m}+L} \text{ for } 0 \le L \le H \tag{15}$$

where B is the base width of the triangular electrodes and $$m = 1 + \frac{1}{\cos\theta} \tag{16}$$

with θ being the angle at the bottom of electrode 1132.

The foregoing sensing systems can be used for monitoring fuel, oil, and other fluid levels in automobiles, toner levels in printers, and water in tanks. The disclosed systems can also be applied to any material that maintains a relatively flat top surface in the cavity (e.g., paper, lumber), and hence could be used for monitoring paper levels in a printer tray.

Numerous other alternative forms, equivalents, and modifications will become apparent to those skilled in the art once the above disclosure is fully appreciated. For example, the disclosed measurements are expected to be relatively insensitive to the size, shape, position, and orientation of the back electrode, and accordingly the back electrode may take different forms, be located remotely from the cavity, and in some embodiments may even be omitted in favor of a "diffuse" ground reference. The electrodes are preferably conductive, but semiconductive materials may alternatively be employed. It is intended that the claims be interpreted to embrace all such alternative forms, equivalents, and modifications that are encompassed in the scope of the appended claims.

What is claimed is:

1. A container comprising:
    a cavity to hold a flowable material; and
    a planar electrode configuration in which a drive electrode surrounds each of two triangular sensing electrodes, the two triangular sensing electrodes having an identical vertical span, a first of the two triangular sensing electrodes having its base at a bottom of the vertical span and a second of the two triangular sensing electrodes having its base at a top of the vertical span, the planar electrode configuration providing a first capacitance between the drive electrode and the first of the two triangular sensing electrodes, and further providing a second capacitance between the drive electrode and the second of the two triangular sensing electrodes, the first capacitance and the second capacitance each being indicative of a level of said flowable material along the vertical span.

2. The container of claim 1, wherein a ratio of variations in the first and second capacitances indicates the level of said flowable material without sensitivity to temperature or permittivity of the flowable material, the variations determined relative to capacitances for an empty container.

3. An apparatus having a liquid level sensor, the sensor comprising:
    a planar electrode arrangement positioned to be adjacent to a cavity for holding a flowable material, the arrangement including:
        two triangular sensing electrodes extending only over a shared vertical range, a first of the two triangular sensing electrodes having its base at a top of the shared vertical range and a second of the two triangular sensing electrodes having its base at a bottom of the shared vertical range; and
        a drive electrode surrounding each of the two triangular sensing electrodes to provide a first capacitance with the first of the two triangular sensing electrodes and a second capacitance with the second of the two triangular sensing electrodes, the first capacitance with a first variation indicative of a level of said flowable material within the shared vertical range and the second capacitance with a second variation indicative of said level; and
    a circuit coupled to the electrode arrangement to determine a ratio of the first and second variations, the ratio being indicative of said level and insensitive to temperature and permittivity of the flowable material.

4. The apparatus of claim 3, wherein the circuit derives a measured level from said ratio.

5. The apparatus of claim 3, further comprising a warning indicator, wherein the circuit activates the warning indicator upon determining that the ratio or the indicated level is below a predetermined threshold.

6. The apparatus of claim 3, wherein the circuit includes at least one differential amplifier to measure the first and second variations relative to a reference capacitance.

7. A method of detecting a level of a material in a container, the method comprising:
    measuring a first capacitance variation between a drive electrode and a first triangular sensing electrode surrounded by the drive electrode, the first triangular sensing electrode having a vertical span along a wall of the container with its base at a bottom of the vertical span;
    measuring a second capacitance variation between the drive electrode and a second triangular sensing electrode surrounded by the drive electrode, the second triangular sensing electrode also having said vertical span along the wall of the container, but with its base at a top of the vertical span; and
    determining a ratio of the first and second capacitance variations, wherein the ratio is indicative of said level and insensitive to temperature and permittivity of the material.

8. The method of claim 7, further comprising:
    deriving a measured level from said ratio; and
    displaying the measured level.

9. The method of claim 7, further comprising: activating a warning indicator upon determining that the ratio or the indicated level is below a predetermined threshold.

10. The method of claim 7, wherein said measuring of the first and second capacitance variations includes:
    supplying a voltage pulse to a common terminal of a reference capacitance and the drive electrode, the reference capacitance having an opposite terminal coupled to a first input of a differential amplifier having its second input coupled to one of the first and second triangular sensing electrodes;
    operating the differential amplifier to equalize voltages on the first and second inputs via separate feedback capacitances, thereby producing an output voltage indicative of a capacitance variation.

* * * * *